US012704429B1

(12) United States Patent
Privat et al.

(10) Patent No.: US 12,704,429 B1
(45) Date of Patent: Aug. 11, 2026

(54) FLUID PRESSURE DETECTOR

(71) Applicant: SAFRAN AEROSYSTEMS, Plaisir (FR)

(72) Inventors: Joël Privat, Moissy-Cramayel (FR); Alban Lemoine, Moissy-Cramayel (FR)

(73) Assignee: SAFRAN AEROSYSTEMS HYDRAULICS, Chateaudun (FR)

(*) Notice: Subject to any disclaimer, the term of this patent is extended or adjusted under 35 U.S.C. 154(b) by 304 days.

(21) Appl. No.: 18/580,541

(22) PCT Filed: Jul. 20, 2022

(86) PCT No.: PCT/EP2022/070416

§ 371 (c)(1),
(2) Date: Jan. 18, 2024

(87) PCT Pub. No.: WO2023/001922

PCT Pub. Date: Jan. 26, 2023

(30) Foreign Application Priority Data

Jul. 21, 2021 (FR) .................................. FR2107866

(51) Int. Cl.

| | |
|---|---|
| ***G01L 13/06*** | (2006.01) |
| ***G01L 9/00*** | (2006.01) |
| ***G01L 9/14*** | (2006.01) |
| ***G01L 11/00*** | (2006.01) |
| ***G01L 19/00*** | (2006.01) |

(52) U.S. Cl.
CPC ............ *G01L 13/06* (2013.01); *G01L 9/0089* (2013.01); *G01L 9/14* (2013.01); *G01L 11/006* (2013.01); *G01L 19/0038* (2013.01)

(58) Field of Classification Search
CPC ......... G01L 13/06; G01L 9/0089; G01L 9/14; G01L 11/006; G01L 19/0038
See application file for complete search history.

(56) References Cited

U.S. PATENT DOCUMENTS 4,186,766 A * 2/1980 Snyder .................. F16K 17/105 137/492.5
6,125,707 A * 10/2000 Haga ................... G01L 19/0092 73/745

FOREIGN PATENT DOCUMENTS

| | | | |
|---|---|---|---|
| EP | 1319936 | A1 | 6/2003 |
| WO | WO2005059343 | A1 | 6/2005 |
| WO | WO2009135612 | A1 | 11/2009 |

* cited by examiner

*Primary Examiner* — Paul M. West
(74) *Attorney, Agent, or Firm* — MUNCY, GEISSLER, OLDS & LOWE, P.C.

(57) ABSTRACT

A pressure detector includes a body delimiting two chambers which are connected to each other by a channel and are each intended to be connected to a source of pressurized fluid, a mobile unit fixed to one end of a rod mounted slidably in the channel and defining with said channel an escape path between the two chambers, and a detector of at least one position of the mobile unit signifying a determined threshold of a pressure difference between the two chambers, the mobile unit being subjected to the action of an elastic element returning said mobile unit towards the channel.

8 Claims, 5 Drawing Sheets

FLUID PRESSURE DETECTOR

BACKGROUND OF THE INVENTION

Generally, pressure detectors are adapted to react to a pressure difference between the pressure of a circuit and a reference pressure, which can be the atmospheric pressure or also the pressure of another circuit.

Pressure detectors are known, comprising a body delimiting two chambers sealed against one another, and which can each be connected to a source of pressurised fluid. In the body, a mobile unit opposingly subjected to the pressure in each of the chambers is mounted slidably. The mobile unit actuates, directly or indirectly, a microcontactor making it possible to detect at least one position of said mobile unit, representative of a pressure difference threshold between the two chambers, and to emit a signal in response to this detection.

The microcontactor is the source of a certain number of problems. Indeed, the travel of the mobile unit can be highly reduced (around a few tenths of a millimetre), making the mounting and the adjustment of the microcontactor highly meticulous, and therefore very expensive. Furthermore, the internal forces of the microcontactor, as well as the forces between the microcontactor and the mobile unit, are difficult to control and disrupt the accuracy of the position detection, particularly in the case of measuring low pressures. The microcontactor, as well as the mobile unit are moreover able to wear, due to contacts and frictions during the manoeuvring of these elements, which limits the normal operating duration of such a pressure detector. Finally, the vibration resistance of a microcontactor is limited.

Other types of pressure detector are known, wherein detecting the position of the mobile unit is ensured by a permanent magnet carried by the mobile unit and by an inductive cell sensitive to the magnetic field of the permanent magnet, fixedly carried by the body facing the permanent magnet. Using an inductive cell avoids any mechanical contact between the mobile unit and the inductive cell, which reduces, in particular, the wear, the risk of mechanical maladjustment, and the disruption of the detection, due to the friction forces.

However, it is provided on this type of pressure detector, that the mobile unit uses, to move, a flexible membrane subjected to the differential action of the pressures in the two chambers, the flexible membrane being clamped between an O-ring and a bearing screwed into the body. Such a pressure detector cannot therefore be used to reliably detect significant pressure differences between the two chambers, the risks of the membrane tearing or sealing defect at the O-ring proving to be high.

AIM OF THE INVENTION

The invention therefore aims to propose a pressure detector of the inductive type, which does not use a flexible membrane to detect a pressure differential.

SUMMARY OF THE INVENTION

To this end, a pressure detector is proposed, comprising a body delimiting a chamber, wherein two channels open, which can each be connected to a source of pressurised fluid, a mobile unit extending inside of the chamber and fixed to a rod mounted slidably in one of the channels by defining with it an escape passage for the fluid, and a detector of at least one position of the mobile unit signifying a determined threshold of pressure difference between the two sources of fluids.

The mobile unit is subjected to the action of an elastic element returning said mobile unit towards the channel wherein the rod slides.

According to a particular feature of the invention, the rod is equipped, at an end opposite that receiving the mobile unit, with an abutment arranged to limit the sliding of the rod towards the chamber.

Particularly, the abutment is equipped with a seal arranged to block the escape passage when the abutment is in contact with the body.

According to another particular feature of the invention, the position detector emits a signal of the logic type, being able to take two distinctive values in response to the detection of the position of the mobile unit.

According to another particular feature of the invention, the position detector comprises a permanent magnet carried by the mobile unit and an inductive cell sensitive to the magnetic field of the permanent magnet fixedly carried by the body facing the permanent magnet.

Particularly, the position detector further comprises a counter-magnet fixedly mounted on the body opposite the permanent magnet of the mobile unit with respect to the inductive cell.

According to another particular feature of the invention, the elastic element is a helical spring.

The invention also relates to a hydraulic actuation system comprising at least one such pressure detector.

The invention also relates to a method for detecting the crossing of a pressure difference threshold implementing such a pressure detector.

BRIEF DESCRIPTION OF THE DRAWINGS

The invention will be best understood in the light of the description below, which is purely illustrative and non-limiting, and must be read regarding the accompanying figures, among which.

DETAILED DESCRIPTION OF THE INVENTION

Figure 1A:
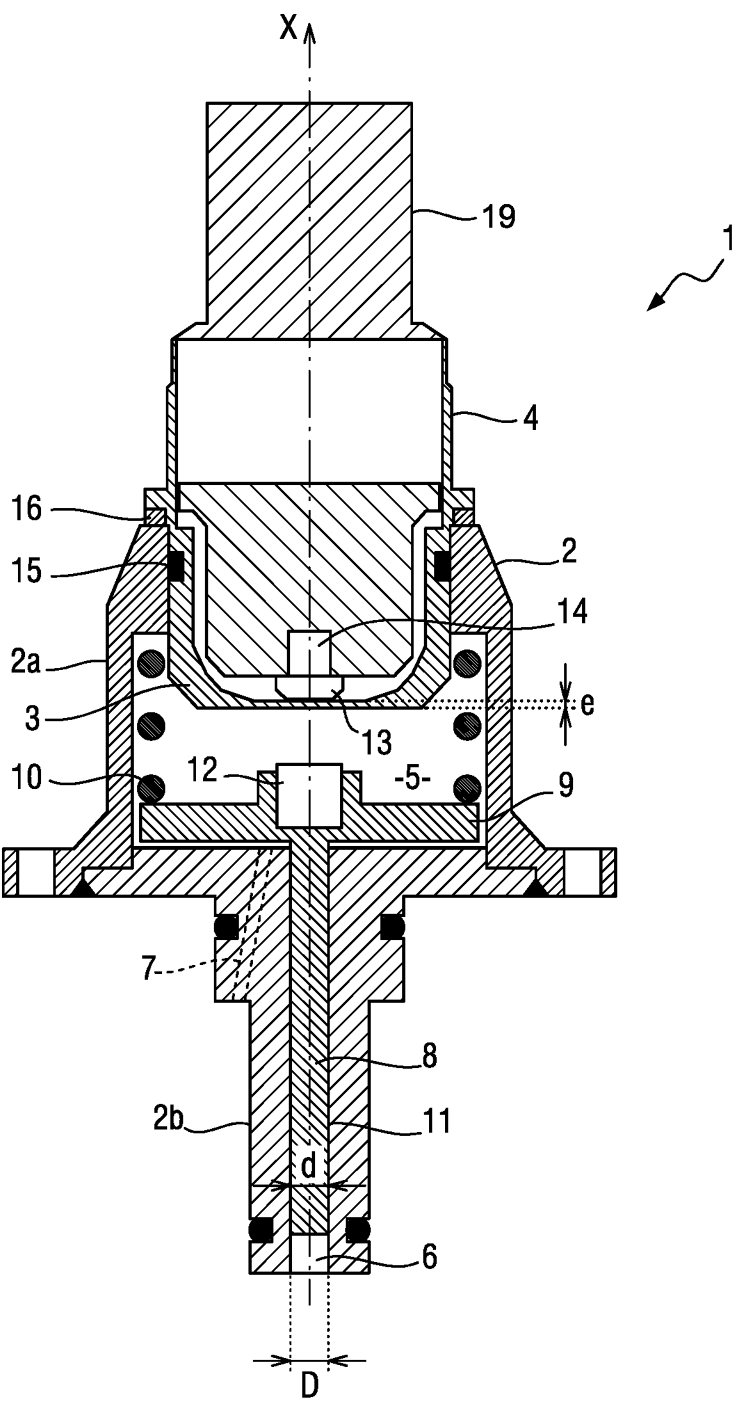
FIG. 1A is a view of a pressure detector according to a particular embodiment of the invention.

In reference to FIG. 1, a pressure detector 1, according to a particular embodiment of the invention, comprises a hollow body 2 which substantially revolves about an axis X. The body 2 is, in this case, constituted of a mainly tubular-shaped upper part 2*a* and a lower part 2*b* forming a bottom of the body 2, the upper part 2*a* and the lower part 2*b* being welded to each other. The lower part 2*b* is a revolving part of axis X having an staged outer surface comprising: first end section, of a larger diameter, fixed to the upper part 2*a* to close an end of said upper end 2*a*; a second end section, of a smaller diameter, intended to be placed in the circuit, the pressure of which is to be measured; and an intermediate section, of an intermediate diameter between the two preceding diameters, connected to the first end section by a first shoulder and to the second end section by a second shoulder. The intermediate section and the second end section are arranged to be engaged in a staged tap connected to the circuit, the pressure of which is to be measured, the first end section forming an abutment at the embedding of the intermediate section and of the second end section in the tap. The upper part 2*a* carries a separator 3 screwed to the inside of the body 2, as well as a cover 4. The separator 3 and the cover 4 define a compartment receiving the electric part of the pressure detector, which will be detailed below.

The body 2 delimits, with the separator 3, a mainly cylindrical-shaped chamber 5, wherein a first channel 6 and a second channel 7 open into, passing through either side of the lower part 2*b* of the body 2.

The first channel 6 is of circular cross-section of diameter D. It extends along an axis combined with the axis X and is intended to be connected to a high-pressure hydraulic (or pneumatic) circuit HP, wherein, in this case, a fluid is led to circulate, almost instantaneously passing from a rest pressure to a working pressure, and vice versa. The rest pressure and the working pressure are, in this case, respectively substantially equal to 10 bars and 200 bars. Under such a pressure gap, the equipment formulation escape criterion, also called ATP escape criterion, on the high-pressure circuit HP is generally substantially equal to 800 $cm^3$/min on the high-pressure circuit HP.

The second channel 7 extends along an oblique axis with respect to the axis X and is intended to be connected to a low-pressure hydraulic (or pneumatic) circuit BP to form an escape path. To this end, the second channel 7 has an end opening into the chamber 5 and an opposite end opening onto the second shoulder of the external surface of the lower part 2*b*. The intermediate section and the second end section are each provided with at least one O-ring to ensure a sealing with the walls of the tap, wherein they are introduced, so as to ensure a sealing of the low-pressure circuit BP which is disposed between the two seals (between the second shoulder and a shoulder of the tap extending facing said second shoulder).

In the first channel 6, a rod 8 is mounted slidably, about the axis X, an upper end of which is secured to a mobile unit 9, in the form of a piston, extending inside of the chamber 5. The mobile unit 9 is fixed with respect to the rod 8 and is subjected to the action of a helical spring 10 bearing on an internal shoulder of the upper part 2*a* of the body 2 and on an upper face of the mobile unit 9. The spring 10 extends coaxially to the axis X and tends to flatten the mobile unit 9 against the bottom of the body 2 which forms an abutment to the movement of the mobile unit, and therefore to the sliding of the rod 8.

A lower end of the rod 8 is intended to be subjected to the pressure of the fluid in the high-pressure circuit HP, and defines with the first channel 6, an escape passage 11 for the fluid. To this end, the rod is cylindrically-shaped and has a diameter d which is slightly less than the diameter D of the first channel 6. The diameter d of the rod 8 is, in this case, substantially equal to 2.5 millimetres and the first channel 6 has, with the rod 8, a diametrical clearance which is substantially equal to 0.03 millimetres.

The rod/mobile unit assembly 8, 9 is thus opposingly subjected to the action of the spring 10 and that of the pressure in the high-pressure circuit HP.

The pressure detector 1 is equipped with an inductive position detector comprising a permanent magnet 12 carried by the mobile unit 9, as well as an inductive cell 13 of the Hall effect type, and a counter-magnet 14, both fixed onto the separator 3 facing the permanent magnet 12. The inductive cell 13 is connected to an electronic board (not represented), which is itself connected to an electric connector 19 extending projecting from the cover 4.

The inductive cell 13, the counter-magnet 14 and the electronic board are contained in the compartment defined by the separator 3 and the cover 4, and are therefore physically separated from the chamber 5. The compartment is made sealed with respect to the chamber 5, using a seal 15 placed between the separator 3 and the body 2.

The operation of the pressure detector 1 will now be detailed.

Figure 1B:
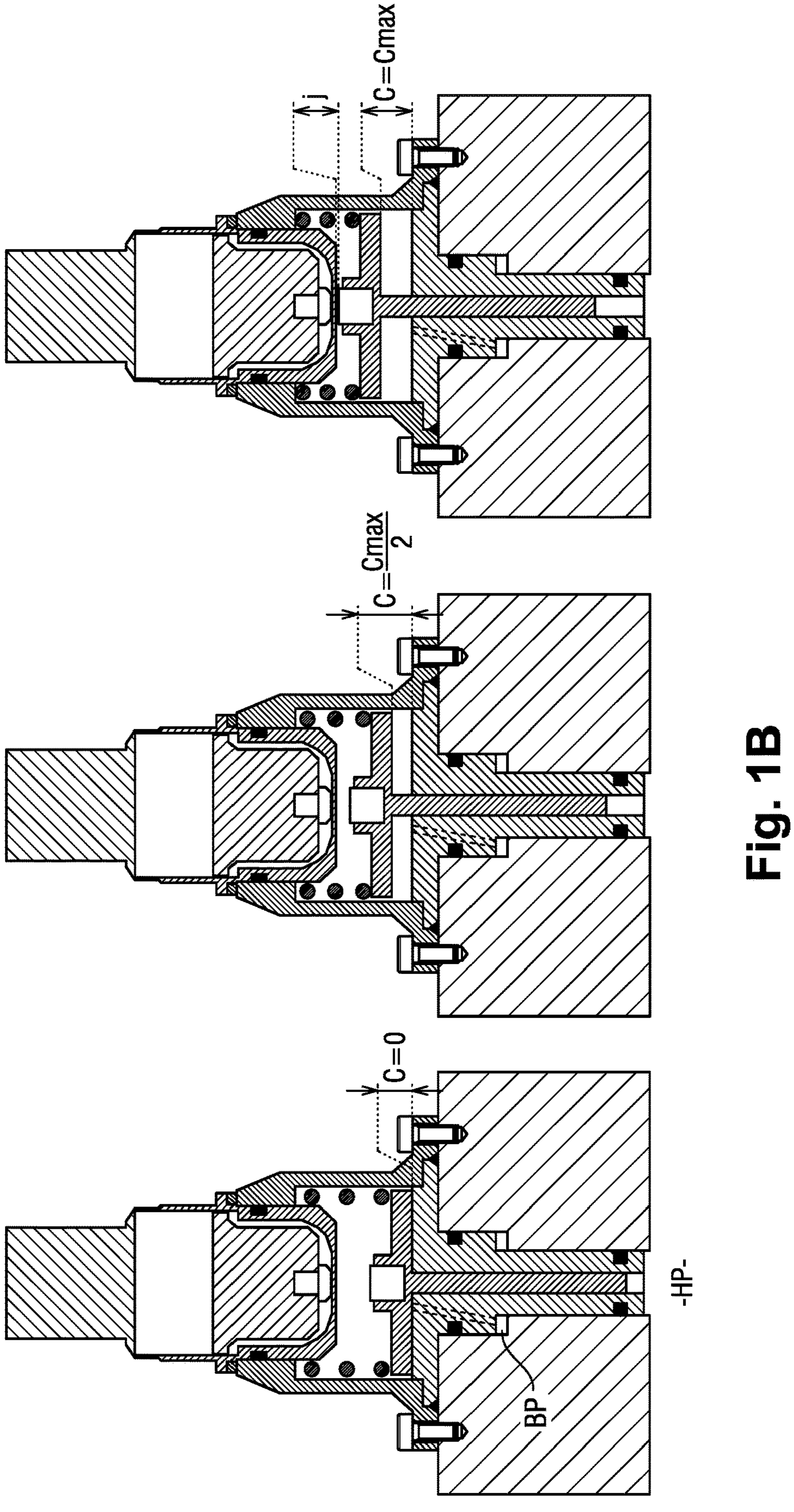
FIG. 1B is a view showing the operation of the pressure detector illustrated in FIG. 1A.

Starting with a zero travel C illustrated in the first part of FIG. 1B, the mobile unit 9 only starts to move if the pressure of the fluid in the high-pressure circuit HP is quite high to overcome a threshold force imposed by the spring 10.

When the fluid circulating in the high-pressure circuit HP passes from the rest state to the working state, the mobile unit 9 moves towards the separator 3 to a stable balanced position, which corresponds to the balance between the force of the spring 10 and the pressure exerted by the fluid of the high-pressure circuit HP on the lower end of the rod 8. At the same time, some of the fluid of the high-pressure circuit HP passes through the escape passage 11 and arrives in the chamber 5, by undergoing a first hydraulic resistance, then etches the second channel 7 to escape from the chamber 5 by undergoing a second hydraulic resistance. This effect is mainly due to the narrowness of the escape passage 11 and the escape path formed by the second channel 7.

Thus, it is conceived that a maximum travel $C_{max}$ of the mobile unit 9 and a minimum clearance j between the permanent magnet 12 and the separator 3 corresponds to the force of the spring 10 associated with the working pressure of the fluid in the high-pressure circuit (FIG. 1B).

It will be noted that the minimum clearance j can, in this case, be defined by an adjustment gauge 16 inserted between a shoulder of the separator 3 and an upper end of the body 2.

It will also be noted that the chamber 5 can be subjected to a pressure close to the working pressure of the fluid in the high-pressure circuit HP, such that the separator 3 must be capable of supporting such a pressure. In particular, the thickness e of the wall of the separator 3, highlighted in FIG. 1A, must be suitably chosen, in order to avoid any deterioration of the inductive cell 13.

When the travel C of the mobile unit 9 is maximum, only some of the rod 8 is in the first channel 6. The escape passage 11 thus has a length along the axis X, in this case, substantially equal to 15 millimetres, which, associated with the values of the diameter d of the rod 8 and of the diametrical clearance causes an escape flow rate of around 40 cm3/min equivalent to 5% of the ATP escape criterion of the high-pressure circuit HP.

Figure 3:
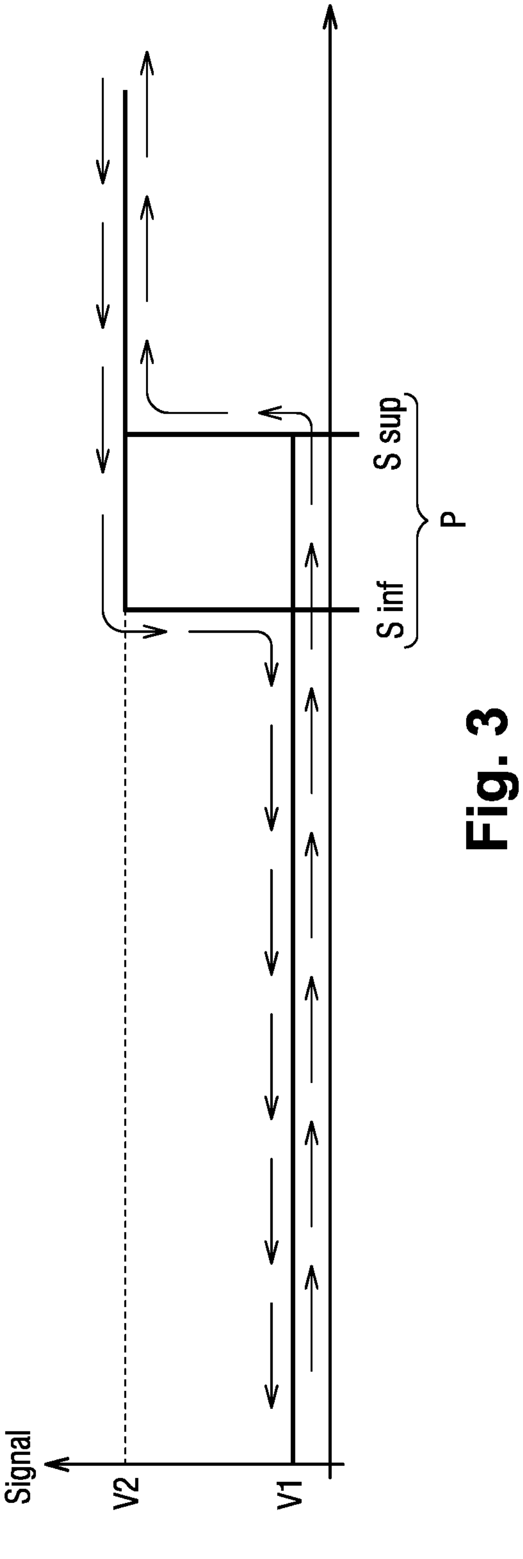
FIG. 3 is a graph representing the performance of the inductive cell equipping the pressure detectors illustrated in FIGS. 2A and 2B.

The performance of the inductive cell 13 is itself illustrated in the graph of FIG. 3, where, on the X-axis, the intensity of the magnet field impacting the inductive cell 13 is shown, and on the Y-axis, the value of the signal produced by the inductive cell 13 in response to the magnetic field. This is an inductive cell delivering a signal being able to only take two values V1, V2 according to the following methods.

If the magnetic field impacting the inductive cell 13 is low, the signal produced by the inductive cell 13 is V1. When the magnetic field impacting the inductive cell increases and exceeds an impact threshold $S_{sup}$, the signals suddenly changes value to take the value V2. When the magnetic field decreases, and becomes less than an impact threshold $S_{inf}$ less than the impact threshold $S_{sup}$, the value of the signal returns to the value V1. The impact thresholds $S_{inf}$ and $S_{sup}$ define a detection range P, and are able to move under the effect of a temperature variation.

In the application illustrated in this case, the magnetic field impacting the inductive cell 13 is that of the permanent magnet 12, while the variations of said magnetic field are due to the movement of the mobile unit 9 and therefore of the permanent magnet 12 under the effect of the pressure of the fluid in the high-pressure circuit HP. Therefore, a correspondence can be established between a determined travel $C_{inf}$ of the mobile unit 9 and the lower impact threshold $S_{inf}$, as well as between a determined travel $C_{sup}$ of the mobile unit 9 and the upper impact threshold $S_{sup}$. Equally, the detection range P will reference a travel interval between the determined travel $C_{inf}$ and the determined travel $C_{sup}$.

The inductive cell 13 is disposed with respect to the mobile unit 9, such that the detection range P of the inductive cell 13 corresponds to a travel, substantially equal to half of the maximum travel $C_{max}$ of the mobile unit which 9, itself corresponds, in this case, to a pressure of the circulating fluid of the high-pressure circuit HP, which is substantially equal to 100 bars.

In a manner known per se, the presence of the counter-magnet 14 mounted opposite the curve of the magnetic field constricts the lines of the magnetic field of the permanent magnet 12, which has the effect of improving the accuracy of the position detector and to enable the use of an inexpensive inductive cell 13.

Figure 2A:
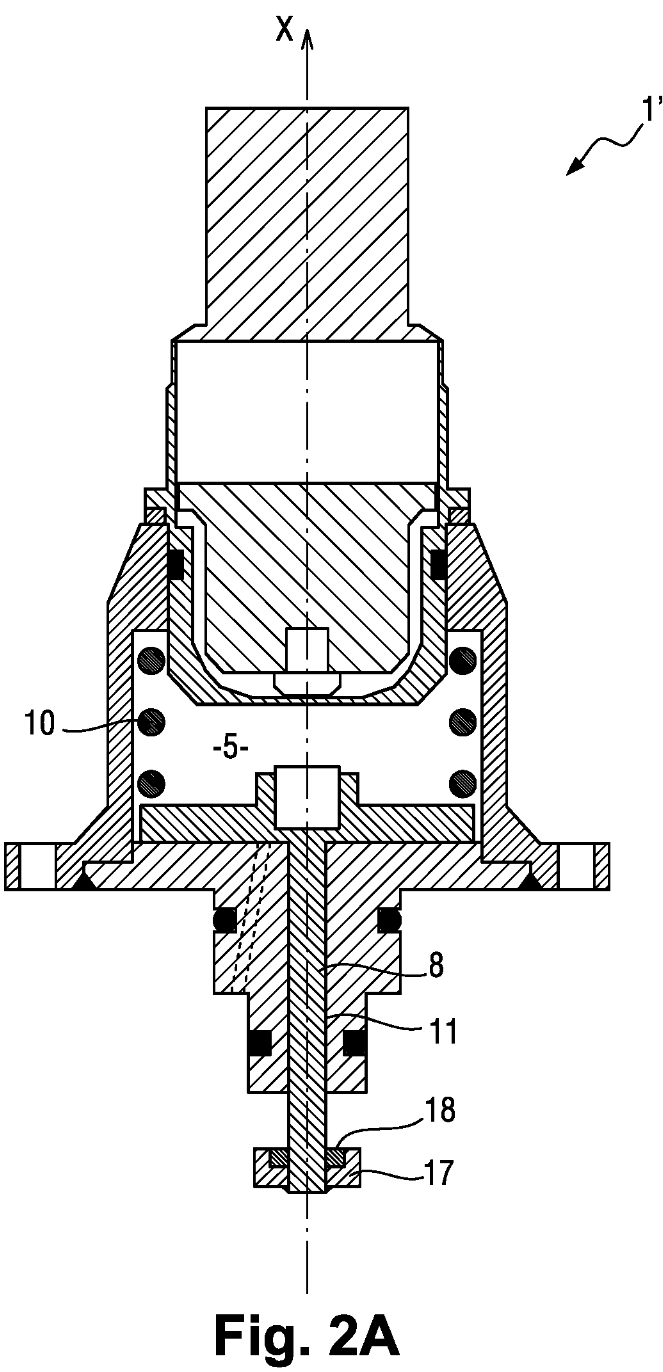
FIG. 2A is a view of a variant of the pressure detector illustrated in FIG. 1A.
Figure 2B:
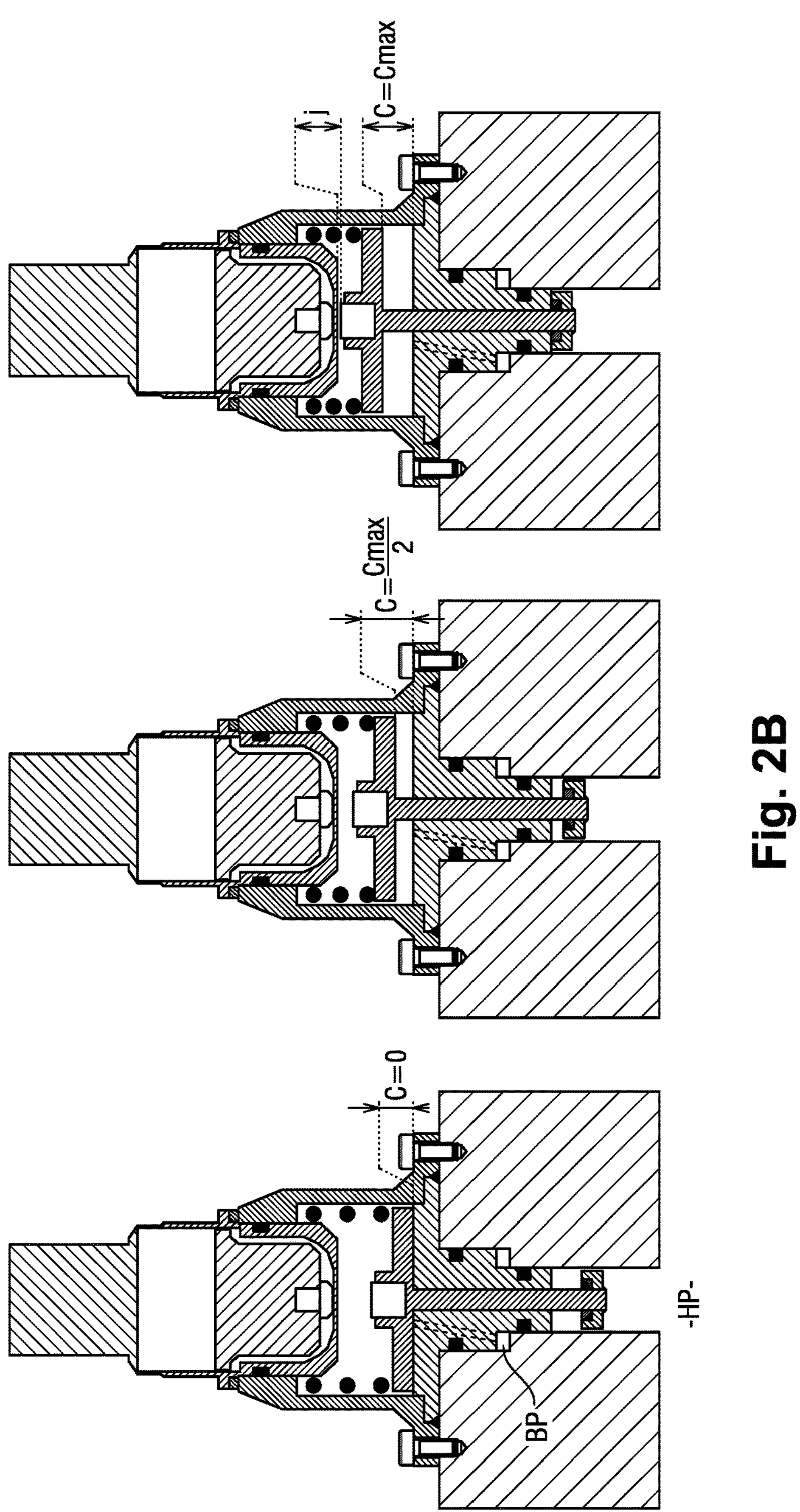
FIG. 2B is a view showing the operation of the pressure detector illustrated in FIG. 2A.

FIG. 2A illustrates a pressure detector 1', which is no other than a variant of the pressure detector 1 illustrated in FIG. 1A.

The pressure detector 1' differs from the pressure detector 1, in that the lower end of the rod 8 is equipped with an abutment 17 arranged to limit the movement of said rod 8 towards the chamber 5, and therefore the travel C of the mobile unit 9.

The abutment 17 comprises a seal 18 housed in an annular groove of said abutment 17 and intended to be in contact with a lower end of the body 2, wherein the first channel 6 opens into, when the travel C of the mobile unit is maximum, so as to prevent the fluid in the high-pressure circuit HP from taking the escape passage 11, and therefore from limiting the escape flow rate of said fluid.

It will thus be noted that the escape passage 11 of the pressure device 1' has a length along the axis X less than that of the pressure device 1 illustrated in FIG. 1A.

Naturally, the invention is not limited to the embodiment described, but includes any variant entering into the field of the invention, such as defined by the claims.

In particular, the pressure detector can have a structure different from that described in relation to the figures.

The helical spring 10 can be replaced by an elastic membrane.

The number and the type of seals can be different from those indicated.

Using a counter-magnet is optional.

Although the contactless detection sensor is, in this case, of the inductive type, it can be of a different nature (optical, etc.).

The invention claimed is:

1. A pressure detector comprising a body delimiting a chamber, wherein two channels open into, arranged to each be connected to a source of pressurized fluid, a mobile unit extending inside the chamber and fixed to a rod mounted slidably in one of the channels, by defining with it an escape passage for the fluid, and a detector of at least one position of the mobile unit signifying a determined threshold of pressure difference between the two sources of fluids, the mobile unit being subjected to the action of an elastic element returning said mobile unit towards the channel wherein the rod slides, and the rod being equipped, at an end opposite that receiving the mobile unit, with an abutment arranged to limit the sliding of the rod towards the chamber.

2. The pressure detector according to claim 1, wherein the abutment is equipped with a seal arranged to block the escape passage when the abutment is in contact with the body.

3. The pressure detector according to claim 1, wherein, in response to the detection of the position of the mobile unit, the position detector emits a signal of the logic type, being able to take two distinctive values.

4. The pressure detector according to claim 1, wherein the position detector comprises a permanent magnet carried by the mobile unit and an inductive cell sensitive to the magnetic field of the permanent magnet fixedly carried by the body facing the permanent magnet.

5. The pressure detector according to claim 4, wherein the position detector further comprises a counter-magnet fixedly mounted on the body opposite the permanent magnet of the mobile unit with respect to the inductive cell.

6. The pressure detector according to claim 1, wherein the elastic element is a helical spring.

7. A hydraulic actuation system comprising at least one pressure detector according to claim 1.

8. A method for detecting a crossing of a pressure different threshold between two sources of pressurized fluid, the method implementing a pressure detector according to claim 1 and comprising:

connecting each of the two channels of the pressure detector to one of the two sources of fluid; and deducing, based on detection of the at least one position of the mobile unit by the pressure detector, the crossing of the pressure different threshold between the two sources of fluid.

* * * * *